United States Patent Office 3,391,948
Patented July 9, 1968

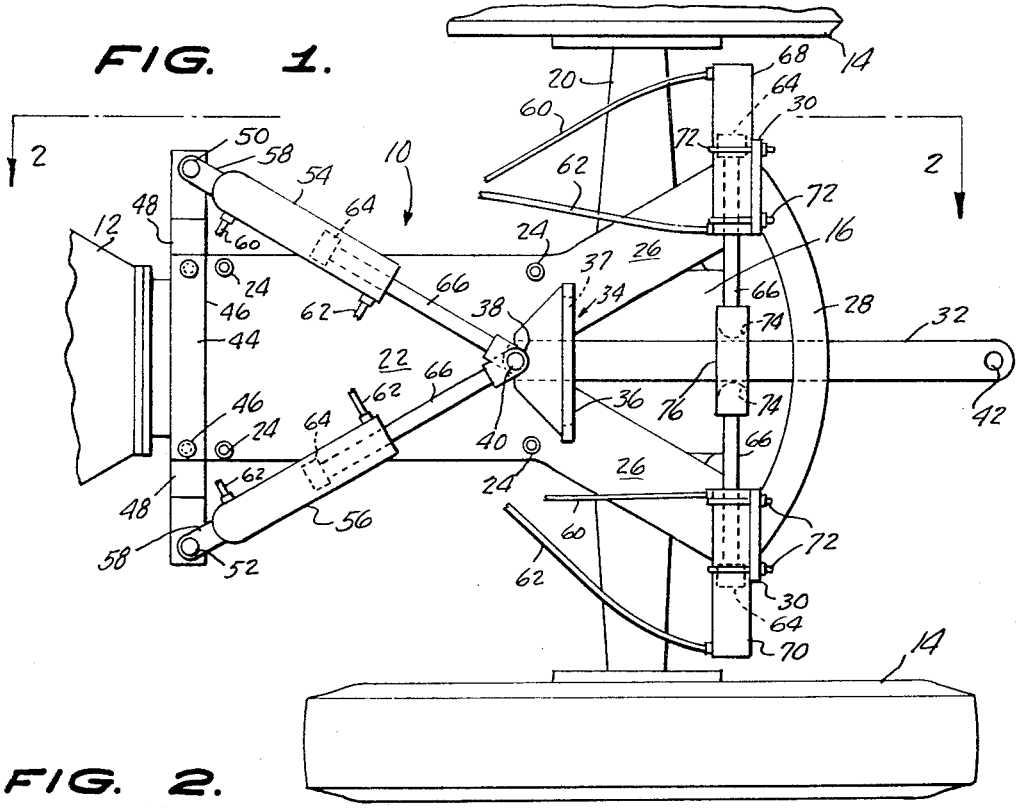

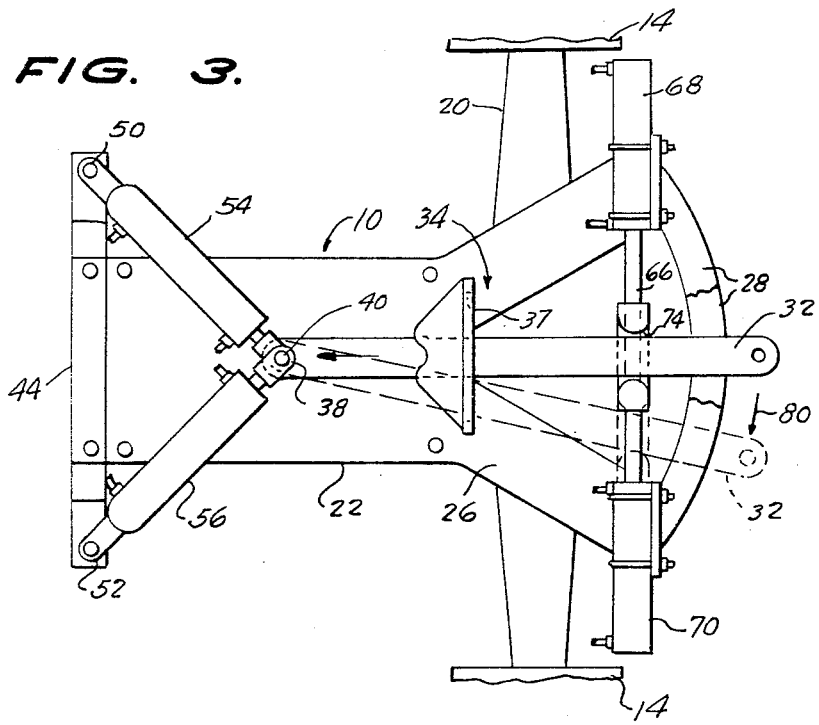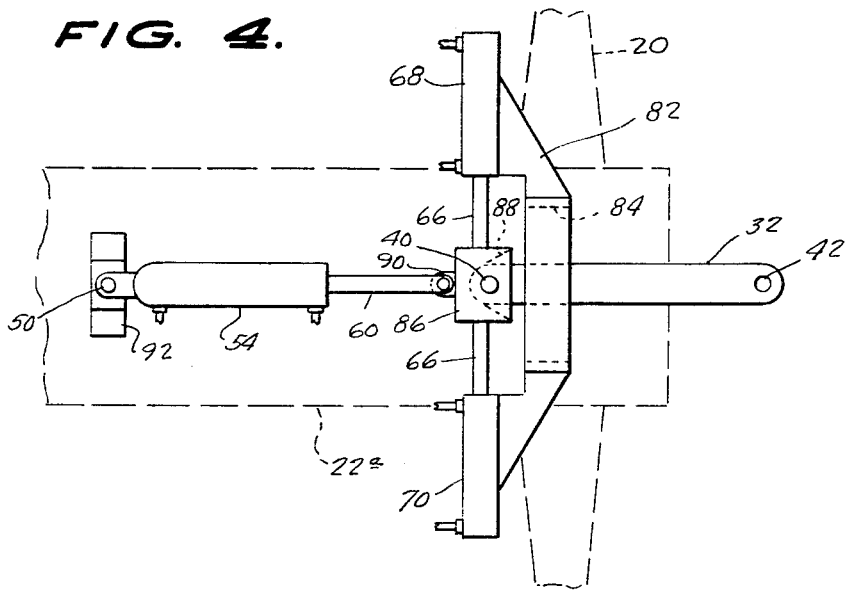

3,391,948
DRAWBAR MECHANISM
Joe F. McCown, Waitsburg, Wash. 99361
Filed Aug. 26, 1966, Ser. No. 575,449
7 Claims. (Cl. 280—407)

ABSTRACT OF THE DISCLOSURE

A drawbar mechanism adapted to be supported on a towing vehicle symmetrically with respect to its longitudinal axis and comprising a support to be fixed to the vehicle, a drawbar supported from and movably disposed with respect to the support and having pivot structure for connection respectively to a towing and a towed vehicle. A guide is provided on the support to restrain the drawbar to movements in a horizontal plane while permitting swinging movements about the pivots at either end of the drawbar. A pair of extensible members, which are fixedly secured at one end to the support on opposite sides of the center thereof, engage the opposite sides of the drawbar for laterally shifting it relative to the vehicle. An extensible member pivotally connectable to the vehicle is provided forwardly of the drawbar with its rear end pivotally connected to the forward end of the drawbar for moving the drawbar forwardly and rearwardly with respect to the towing vehicle.

---

This invention relates generally to a drawbar mechanism for use on a towing vehicle for connection to a towed vehicle, agricultural implement, road-working tool or the like, and more particularly to an improved drawbar mechanism in which the drawbar may be shifted longitudinally, as well as laterally, with respect to the towing vehicle while still permitting swinging movements of the drawbar in the horizontal plane.

The usual drawbar mechanism comprises an elongated bar pivoted at its ends to the towing and towed vehicles so that the weight and force exerted by the towed vehicle, or other device, is always applied to the towing vehicle at the same point, usually near the rear of the towing vehicle. While this is satisfactory when traveling on smooth, level terrain, difficulties arise when traveling up and down slopes, when traveling sidehill, and when traveling in rough terrain. In such instances, the balance of the tractor, or towing vehicle, is disturbed due to shifting of its center of gravity with changes of slope of the terrain, and such imbalance is worsened by failure to shift the load point of the towed vehicle. On steep slopes there is danger of overturning the tractor, and in all instances the traction, and hence the efficiency of the towing vehicle, is considerably lessened.

It is the primary object of the present invention to provide an improved drawbar mechanism which will obviate the above-stated disadvantages of conventional mechanisms.

It is an important object of the invention to provide a drawbar mechanism which, when applied to a tractor, provides better balance and traction while traveling up and down hills and also while traveling along sidehill slopes.

Another object of the invention is to provide an improved drawbar mechanism whose operation increases the efficiency of a towing vehicle while towing a trailer, agricultural implement, road-working machine, or other type of towed vehicle.

A further object of the invention is to provide a drawbar mechanism incorporating means for shifting the drawbar longitudinally with respect to the towing vehicle.

Still another object of the invention is to provide a drawbar mechanism incorporating means for shifting the drawbar laterally with respect to the towing vehicle.

Yet another object of the invention is to provide an improved drawbar mechanism incorporating plural force-exerting, or applying, means which may be controlled individually, or in conjunction with each other, to vary the relative disposition of the towing and towed vehicles.

A further object of the invention is to provide an improved drawbar mechanism, having the foregoing characteristics, in which said force-exerting means comprises two-way, movable expanding and contracting members.

Yet another object of the invention is to provide a drawbar mechanism, having the above-described characteristics, in which said force-exerting means are double-acting, fluid pressure, cylinder ram devices.

A still further object of the invention is to provide an improved drawbar mechanism, of the foregoing character, which is adaptable to a conventional tractor.

Yet a further object of the invention is to provide an improved drawbar mechanism, having the foregoing characteristics, which is simple in structure, easy and inexpensive to fabricate, and easy to install and operate.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIGURE 1 is a bottom plan view of a portion of the rear of a tractor equipped with an improved drawbar mechanism according to the invention;

FIGURE 2 is a side elevational view, partly in section, taken from line 2—2 of FIGURE 1 and looking in the direction of the arrows;

FIGURE 3 is a fragmentary, bottom elevation similar to FIGURE 1, but showing the drawbar shifted forwardly to a different position; and FIGURE 4 is a bottom elevation similar to FIGURE 3 of a different embodiment of the drawbar mechanism.

Referring now more particularly to the drawing, in FIGURES 1–3 is illustrated a preferred embodiment of the invention in which the improved drawbar mechanism is generally characterized by the reference numeral 10 and shown affixed to the underside of a tractor or other towing vehicle having a transmission housing 12, rear wheels 14, a differential housing 16, a rear axle 18, and a rear axle housing 20.

The drawbar mechanism 10 comprises a flat, Y-shaped support means, or plate 22 affixed by the bolts 24 to the underside of the axle and differential housings. The arms 26 of the Y-shaped plate are connected at their rear ends by a pair of vertically spaced arcuate strips 28, welded, or otherwise secured, to down-turned flanges 30 at the rear of the Y-arms. The space between the flat strips 28 movably houses and guides the swinging movements of a drawbar 32, so that parts 28 and 30 together form a guide for an intermediate portion of the drawbar. The drawbar is supported at its forward end in an angle bracket 34 having a vertical wall 36 having a wide slot 37 movably receiving the drawbar. Wall 36 is welded, or otherwise secured, to support plate 22 near the juncture of the Y-arms 26 with the stem portion of the Y-plate. Bracket 34 has two forwardly extending, vertically spaced flanges 39 above and below slot 37 and whose forward edges are notched at 38 to seat the pivot pin 40 which passes through an aperture in the forward end of the drawbar. Thus, the bracket forms a stop limiting rearward movement of the drawbar at a point which corresponds to the normal location of the forward drawbar pin in conventional tractor drawbar mechanism. The rear end of the drawbar 32 is provided with an aperture 42 for reception of a pivot pin which will connect the tractor to a trailer, or other towed vehicle, implement or machine.

Another bracket 44 of bar shape is bolted at 46 to the underside of support plate 22 at its forward end, the opposite ends of the bracket being angled or offset downwardly at 48 leaving end portions extending laterally beyond each side of plate 22 and which are apertured to receive pivot bolts 50, 52. These bolts pivotally connect two fluid pressure cylinders 54, 56 by passing through apertures in two pairs of straps 58 affixed to the forward end of the cylinders and straddling the ends of bracket 44. Thus, cylinders 54, 56 are each disposed at an oblique angle to the longitudinal centerline of the towing vehicle, which overlies the corresponding centerline of support plate 22.

The cylinders 54, 56 are preferably of the double-acting type and have pressure fluid inlet and outlet conduits 60, 62 partially shown as being coupled to opposite ends of each cylinder. Each cylinder has an internal piston 64 whose rod, or ram 66 is connected at its outer end by a pivot aperture receiving the pivot pin 40 at the forward end of the drawbar. A similar pair of double-acting fluid pressure cylinders 68, 70 are connected to operate in alignment, and laterally of the longitudinal centerline of the towing vehicle, being clamped by U-bolts 72 to the flanges 30 at the ends of the Y-arms on the support plate. The pistons 64 of cylinders 68, 70 have rams 66 whose outer ends are provided with rounded heads 74 which are in turn securely affixed to opposite ends of a coupling member 76. This coupling has upper and lower spaced plates between which an intermediate portion of the drawbar is slidably and angularly movable.

The inlet and outlet pressure fluid conduits 60, 62 for both pairs of cylinders 54, 56, 68 and 70 are connected in a known manner to control valves and a control panel, not shown, in the cab of the tractor for manipulation by the operator in a conventional way to extend or retract the rams of the cylinders either individually or conjointly. If desired, an automatic mechanism can be provided for controlling the operation of the cylinders in accordance with the terrain over which the towing vehicle may be moving.

It will be apparent from the above description that the drawbar mechanism will operate substantially as follows: In FIGURE 1 the drawbar is shown in a normal position, corresponding to that of conventional drawbars, with its forward pivot pin 40 resting against the arcuate surfaces 38 of the stop member 34 by reason of the equal extension of the rams of cylinders 54, 56. This is the position of the drawbar for towing a trailer, or other vehicle, on smooth level terrain such as flat roads and in which the load of the trailer is applied to the tractor at the stop member in a vertical plane just ahead of the rear axle. In this position of the drawbar and associated mechanism, the tractor while on level ground is well balanced and operates with full traction on both rear wheels. As the direction of travel changes due to turns in the road, etc., the pivot means at both ends of the drawbar permit the towing and towed vehicles to freely turn, the drawbar being restrained from taking angular positions by the force of pressure fluid applied to the four cylinders.

If desired, pressure fluid may be applied to one side of pressure fluid cylinder 68 and the other side of the opposed cylinder 70 to assist or cause such angular turning movements of the drawbar mechanism and thereby assist in guiding the towed vehicle about a curved path.

By applying pressure fluid through conduits 62 to the rear ends of the cylinders 54, 56 their rams will be retracted, shifting the forward pivot pin 40 and forward end of the drawbar forwardly and away from the stop member 34, as shown in FIGURE 3. Such shifting is highly desirable when the tractor is traveling uphill, to prevent overturning of the tractor by moving the point of application of the load force of the trailer forwardly to counterbalance the rearward shift of the vertical force vector emanating from the center of gravity of the tractor caused by the slope. Of course, different degrees of retraction of the rams of cylinders 54, 56 may be exercised in which case the forward pivot of the drawbar will be shifted greater or lesser amounts in the direction of the arrow 78, and the exercise of more retraction on one ram than on the other will shift the pivot pin 40 out of the vertical plane of the axis of the tractor and to one side thereof.

The broken line showing of the drawbar 32 in FIGURE 3 indicates that the drawbar is still free to swing in the guide 28 and stop member 34 when it has been shifted forwardly. Appropriate application of pressure fluid to cylinders 68, 70 will move the drawbar in direction of arrow 80 to said broken line position, the ram of cylinder 68 being extended and the ram of cylinder 70 retracted. The trailer connected to the rear of the drawbar is thus displaced laterally with respect to the tractor. This is particularly advantageous when the tractor is moving along a slope, i.e., when the wheels on one side of the tractor are higher than those on the other side. By shifting the trailer toward the high side, the balance and traction of the tractor are greatly improved and the tendency to overturn sidewise is overcome. Thus, by appropriate application of pressures in the four cylinders, the drawbar 32 may be shifted at will to suit the terrain and to positions lateral of or angularly disposed with respect to the centerline of the tractor, such positions all lying in a horizontal plane as the drawbar is supported and guided by the slotted stop member 34 and the arcuate spaced guide members 28.

In FIGURE 4 is shown another, and somewhat simplified, embodiment of the invvention which is identical in structure to that of FIGURE 1 except as explained below. The Y-shaped support is replaced by a rectangular plate 22a having a yoke-shaped bracket 82 disposed transversely of the plate and fastened thereto by welding, or in any other suitable manner. The bracket 82 is centrally provided with vertically spaced plates leaving an opening 84 for angular movements of the drawbar. The laterally disposed arms of bracket 82 carry the opposed pair of fluid pressure cylinders 68, 70 which are affixed thereto in any suitable way and whose rams 66 are secured at their outer ends to a coupling member 86 for pivot pin 40 at the forward end of the drawbar. A slot, or groove 88 is provided to open in the rear face of coupling 86, permitting angular movements of the drawbar 32 about the pivot connection. Coupling member 86 has a forwardly projecting boss 90 to which is pivoted the outer end of the ram 66 of a single fluid pressure cylinder 54 whose cylinder is pivotally connected at 50 to a short angle bracket 92 welded, or otherwise secured, centrally of plate 22a or to any fixed portion of the towing vehicle such as the frame, differential housing, or the like. The cylinder 54 thus normally lies in the vertical plane which includes the longitudinal axis of the tractor but may swing to take up oblique positions with respect to said plane.

The embodiment of FIGURE 4, as described above, utilizes the three cylinders to laterally move the drawbar in the same manner as described for the embodiment of FIGURES 1-3. Thus, retraction of the ram of cylinder 68 and extension of the ram of cylinder 70 will move the forward end of the drawbar laterally toward cylinder 68 and out of the vertical plane of the axis of the towing vehicle. This will cause the towing and towed vehicles to move in parallel paths, the towed vehicle being drawn along in a path laterally of the towing vehicle. The forward cylinder 54, being pivoted to the towing vehicle and having the rear end of its ram pivoted to the coupling member 86, accommodates the lateral shifts of the coupling member and the drawbar. Since the rams of the laterally disposed cylinders 68, 70 are securely fixed to the coupling member 86 and the cylinders are fixed to the towing vehicle, no forward shifting of the drawbar is possible, the extension of and the retraction of the ram of the forward cylinder 54 merely accommodating the lateral shifting of the coupling member 86. It is thus apparent that the embodiment of FIGURE 4 is primarily suitable for towing vehicles along slopes when it is desired to shift the towed vehicle toward the high side of the slope with respect to the tractor.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A drawbar mechanism, comprising support means adapted to be fixed with respect to the longitudinal axis of a towing vehicle, a drawbar supported from and movably disposed with respect to said support means having pivot means at its forward and rear ends for connection respectively to a towing and a towed vehicle, a guide on said support means restraining said drawbar to movements in a horizontal plane while permitting swinging movement about said pivot means at either end of the drawbar, a pair of extensible members each fixedly secured at one end of said support means on opposite sides of the center thereof and having force applying inner ends engaging opposite sides of the drawbar for laterally shifting the drawbar in said guide with respect to a towing vehicle, an extensible means having its rear end pivotally connected to the forward end of the drawbar and means at its forward end for pivotal connection to a towing vehicle, whereby said extensible means is adapted to move the drawbar forwardly and rearwardly with respect to the towing vehicle.

2. A drawbar mechanism according to claim 1, wherein said extensible means comprises a second pair of extensible members having their rear, force applying ends pivotally connected to the forward end of the drawbar and means at their forward ends for pivotal connection to a towing vehicle.

3. A drawbar mechanism according to claim 2, wherein said support means has a longitudinal centerline adapted to fall in a vertical plane containing the longitudinal axis of a towing vehicle when affixed thereto, said first pair of extensible members being aligned for operative movement transverse to said centerline, and said second pair of extensible members being obliquely disposed with respect to said centerline.

4. A drawbar mechanism according to claim 2, wherein said support means extends forwardly to the forward ends of said second pair of extensible members, a laterally disposed bracket being secured to the forward end of said support means so as to extend beyond the sides thereof, and the forward ends of said first pair of extensible members being pivoted to said bracket at its opposite ends.

5. A drawbar mechanism according to claim 4, wherein said first and second pairs of extensible members comprise four double-acting, fluid pressure, cylinder ram devices.

6. A drawbar mechanism according to claim 5, wherein a stop member is provided on said support means at a position in rear of the pivot means at the forward end of the drawbar when the extensible members of said second pair are equally extended to prevent further rearward movement of the drawbar, said stop member having an arcuate seat for pivotally supporting means at the forward end of the drawbar.

7. A drawbar mechanism according to claim 6, wherein said support means is Y-shaped with the base extending forwardly and its arms diverging rearwardly, said fixed ends of the first pair of extensible members being supported on said arms in such manner that the inner force applying ends are aligned and transverse to the axis of a towing vehicle, said guide comprising a pair of vertically spaced members connecting the ends of the Y-arms, the space between said members receiving the drawbar for swinging movements in a horizontal plane.

References Cited

UNITED STATES PATENTS

| | | | |
|---|---|---|---|
| 1,962,423 | 6/1934 | Brown | 280—468 |
| 2,600,016 | 6/1952 | Miller | 280—468 |
| 2,653,031 | 9/1953 | Butler. | |
| 2,686,063 | 8/1954 | Ash | 280—467 |
| 2,818,275 | 12/1957 | Hollowell | 280—443 |

FOREIGN PATENTS 435,178    12/1934    Great Britain.

LEO FRIAGLIA, *Primary Examiner.*